United States Patent [19]

Nakajima et al.

[11] Patent Number: 5,333,159
[45] Date of Patent: Jul. 26, 1994

[54] RADIATION GAUGE

[75] Inventors: Shigeji Nakajima; Tatsuo Shikama, both of Ibaraki, Japan

[73] Assignee: Nakajima Seisakusho Co., Ltd., Ibaraki, Japan

[21] Appl. No.: 977,536

[22] Filed: Nov. 17, 1992

[30] Foreign Application Priority Data

Nov. 19, 1991 [JP] Japan ................................ 3-303542

[51] Int. Cl.5 .............................................. G21C 17/00
[52] U.S. Cl. .................................... 376/254; 376/153; 376/255; 250/370.1
[58] Field of Search ................. 376/254, 255, 153; 250/389, 370.1

[56] References Cited

U.S. PATENT DOCUMENTS

| 2,543,039 | 2/1951 | McKay | 250/370.01 |
| 2,694,112 | 11/1954 | McKay | 250/370.01 |
| 2,717,964 | 9/1955 | Parsegian et al. | 250/370.01 |
| 4,609,520 | 9/1986 | Kronenberg | 376/153 |
| 4,623,508 | 11/1986 | Glesius | 376/254 |

Primary Examiner—Donald P. Walsh
Assistant Examiner—Frederick H. Voss
Attorney, Agent, or Firm—Tarolli, Sundheim & Covell

[57] ABSTRACT

A radiation gauge is provided which comprises a casing having an evacuated inside, a pair of electrode plates contained within the casing, and an insulating material of aluminum oxide disposed between the pair of electrode plates, the insulating material undergoing an induced conduction phenomenon when ionizing radiation is illuminated thereon, whereby intensity of ionizing radiation can be measured based on the induced conduction phenomenon of the insulating material.

6 Claims, 2 Drawing Sheets

RADIATION GAUGE

BACKGROUND OF THE INVENTION

1. Field of the Invention

This invention relates to a radiation gauge utilizing a irradiation induced conduction phenomenon.

2. Description of the Prior Art

In order to facilitate safety operation of a nuclear reactor, it is essential to monitor the output of the nuclear reactor. At present, a fission counter tube or a BF counter tube is generally used for monitoring the output of the nuclear reactor.

The fission counter tube is adapted to measure the output of the nuclear reactor by utilizing dissociation of gas caused by fission fragments generated during nuclear fission of uranium etc. The BF counter tube is adapted to measure the output of the nuclear reactor by utilizing dissociation of gas caused by alpha rays generated from reaction of boron.

The fission counter tube and BF counter tube both utilize nuclear reactions, so that they have a very short life when used under a high output circumstances. The above tubes frequently utilize a special gas and therefore it is difficult for them to be used under high temperatures. Because they may only have a high sensitivity in a specific range, they are difficult to be handled and are relatively expensive.

Under the circumstances, such conventional counter tubes, when used to measure the output of a particular nuclear reactor, are disposed outside of a reactor core. Thus, the output can only be obtained indirectly by means of an extrapolation method. In addition, a type of such counter tubes should be changed depending upon the output of a nuclear reactor. Accordingly, it is difficult to accurately monitor the output of the nuclear reactor by means of the conventional counter tubes.

SUMMARY OF THE INVENTION

It is a main object of the invention to provide a radiation gauge which has a high radiation-resistance, which may be used under high temperature, which may be disposed within a reactor core to measure and monitor output of a nuclear reactor.

In order to achieve the above object, there is provided in accordance with the invention a radiation gauge comprising a casing having an evacuated inside, a pair of electrode plates contained within the casing, and an insulating material disposed between said pair of electrode plates, the insulating material undergoing an induced conduction phenomenon when ionizing radiation is illuminated thereon, whereby intensity of ionizing radiation can be measured based on the induced conduction phenomenon of said insulating material.

The radiation gauge of the invention may be disposed within a nuclear reactor. When an electric potential is applied between the pair of electrode plates to cause the insulating material to be illuminated by ionizing radiation, an induced conduction phenomenon is caused in the insulating material disposed between the pair of electrode plates. Thus, an electrical change may be recognized between the pair of electrode plates, the value of such a change depending upon the intensity of ionizing radiation applied to the insulating material. Accordingly, it is possible to monitor the output of the nuclear reactor by measuring electrical changes, e.g., changes in electrostatic capacity or current etc., between the pair of electrode plates.

BRIEF DESCRIPTION OF THE DRAWINGS

For a better understanding of the invention, and to show how the same may be carried into effect, reference will now be made, by way of example, to the accompanying drawings in which like reference numerals refer to like elements.

DETAILED DESCRIPTION OF PREFERRED EMBODIMENTS

One embodiment of the invention will be explained hereinbelow with reference to FIGS. 1 through 6.

Figure 1:
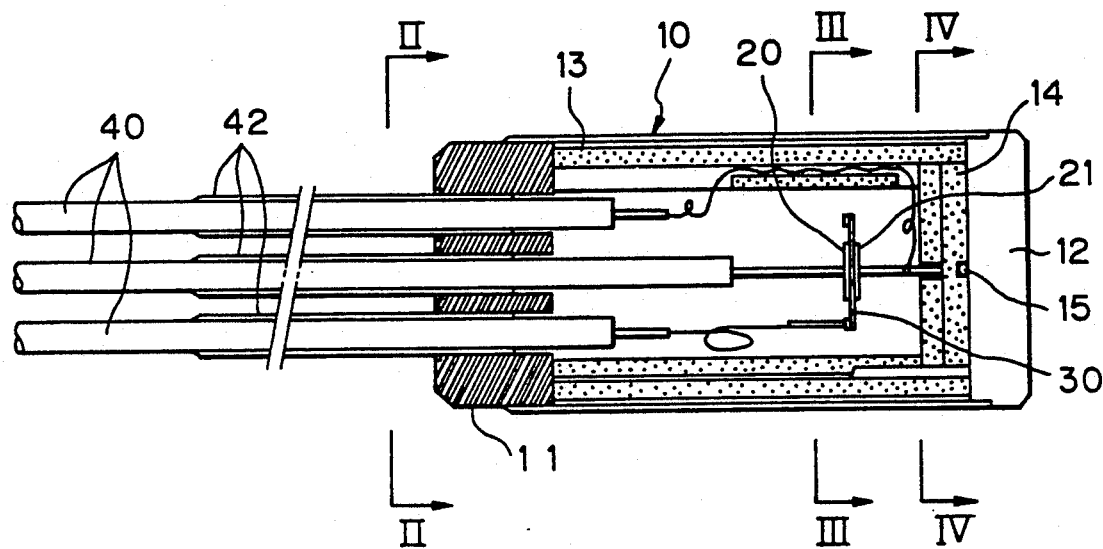
FIG. 1 is a sectional view of a radiation gauge according to one embodiment of the invention, with a portion omitted.
Figure 2:
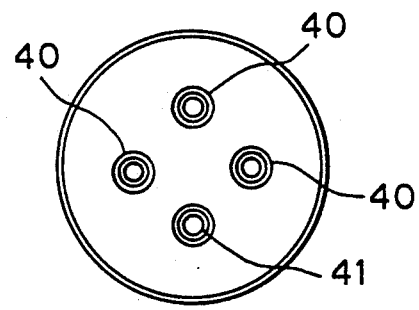
FIG. 2 is a sectional view taken along line II—II of FIG. 1.
Figure 3:
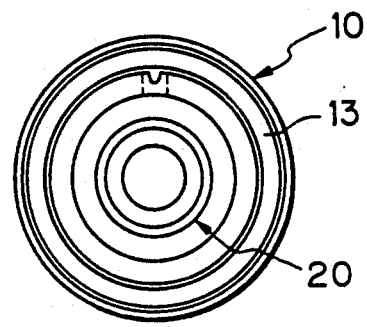
FIG. 3 is a sectional view taken along line III—III of FIG. 1.

A radiation gauge according to one embodiment of the invention includes, as shown in FIG. 1, a substantially cylindrical casing 10 made from a metal material and having an evacuated inside, a pair of electrode plates 20, 21 contained within the casing 10, an insulating material 30 disposed between the pair of electrode plates 20, 21, a plurality of cables 40 connected to one of the axial end surface of the casing 10, and a conduit 41 for allowing gas flow therethrough.

The casing 10 may be made, for example from an iron-nickel alloy (Fe-Ni alloy). The inside of the casing 10 is evacuated, for example to about $1 \times 10^{-5}$ Torr, by means of the gas conduit 41. A terminal plate 11 of a ceramic material is secured to one axial end surface of the casing 10, and a bottom plate 12 of a stainless steel is secured to the other axial end surface of the casing 10. An insulating ring 13 and an insulating plate 14 are attached to the inner peripheral surface of the casing 10 and inner surface of the bottom plate 12, respectively. The insulating ring 13 and insulating plate 14 are both formed by aluminium oxide ($Al_2O_3$).

Figure 5:
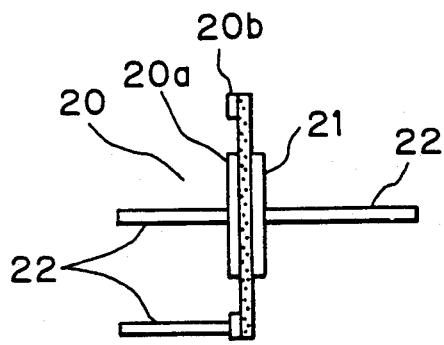
FIG. 5 is a side view illustrating electrode plates and insulating material.
Figure 6:
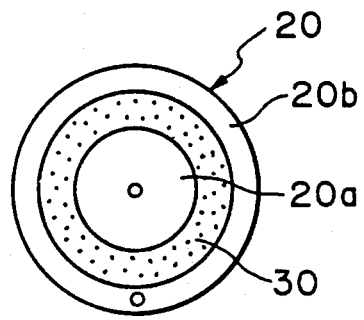
FIG. 6 is front view of the radiation gauge of the invention.

The electrode plates 20, 21 are formed from copper (Cu). One electrode plate 20 includes a disk-shaped electrode portion 20a and an annular electrode portion 20b disposed in a concentric relationship with the electrode portion 20a as shown in FIGS. 5 and 6. The other electrode plate 21 has the same configuration and size as that of electrode portion 20a. The electrode portions 20a, 20b, and the electrode plate 21 are brazed to the insulating material 30 by means of Ag-Cu solder. Electrode leads 22 of copper are brazed to the electrode portions 20a, 20b and electrode plate 21, respectively, by means of Ag-Cu solder. Each electrode lead 22 is connected to a respective one of the cables 40.

An induced conduction phenomenon or a current, a voltage or the like will be caused when an ionizing radiation is illuminated on insulating material 30. The insulating material may be formed, for example by aluminium oxide ($Al_2O_3$; 99.5%), a single crystal of sapphire or the like.

Each cable 40 is sheathed with an insulating tube 42 of silica glass ($SiO_2$) and extends through the ceramic terminal plate 11 and is fixed to the terminal plate 11 through the insulating tube 42. The gas conduit 41 also extends through the ceramic terminal plate 11 and is fixed thereto. It should be noted here that the gas conduit 41 will be closed or sealed off after the inside of the casing 10 has been evacuated to a predetermined degree.

Figure 4:
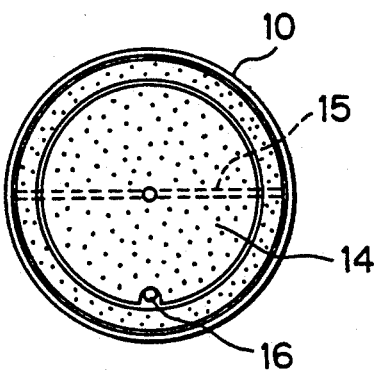
FIG. 4 is a sectional view taken along line IV—IV of FIG. 1.

In FIG. 1, reference numeral 15 designates a set or fixing pin, while, in FIG. 4, reference numeral 16 designates a knock pin.

The radiation gauge according to a preferred embodiment of the invention as constructed above operates as follows.

When ionizing radiation is illuminated onto a mass of aluminium oxide ($Al_2O_3$, 99.5%) forming the insulating material, with a voltage of 500-1000 volts applied to the pair of electrode plates 20, 21 via the cables 40, an induced conductive phenomenon is caused in the insulating material 30. The radiation gauge measures intensity of radiation by utilizing the phenomenon. The radiation gauge of the invention has a high radiation-resistance (measurable intensity of radiation will be equal to more than $10^{10}$ R/h). The radiation gauge may be used under high temperatures. The radiation gauge may provide linear response to a variety of nuclear reactor outputs with high sensitivity, since it only utilizes a simple physical phenomenon. Furthermore, the radiation gauge of the invention is of a simple and compact construction and is inexpensive.

Accordingly, the radiation gauges of the invention may be located in a nuclear reactor so as to monitor output of the nuclear reactor for a prolonged period of time in an on-line manner. The radiation gauge may cover a wide range of output of a nuclear reactor, including output upon the nuclear reactor stoppage, a very low output upon reaching a critical point, and very high output upon full-powered operation of the reactor. The response of the radiation gauge has high linearity with high sensitivity.

A plurality of radiation gauges of the invention may be provided at several locations within a nuclear reactor. In such a case, and when a predetermined amount of voltage is applied to the pair of electrode plates 20, 21 through the cable 40, an induced conductive phenomenon is caused in the insulating material 30 disposed between the pair of electrode plates 20, 21, since the insulating material 30 is illuminated by gamma rays generated from nuclear fission occurred in the nuclear reactor. Thus, electric change may be present between the pair of electrode plates 20, 21 depending upon the intensity of the gamma rays. This electric change, electrostatic capacity for example, can be measured via the cables 40 by a sensor or measurement device located outside the reactor, whereby monitoring of output of the reactor is made possible.

In this case, the radiation gauge is also highly radiation-resistive and is capable of measure gamma rays having intensity of more than $10^{10}$ R/h, that are at present not possible to be measured.

The present invention should not be limited to the above embodiment. The invention is intended to cover any devices or methods in which intensity of ionizing radiation is measured based on the induced conduction phenomenon of an insulating material.

As stated above, and in accordance with the invention, there is provided a radiation gauge which has a high radiation-resistance, which may be used under high temperature, and which may be disposed within a reactor core to measure and monitor output of a nuclear reactor. Further, gamma rays having intensity of $10^{10}$ R/h or more can be measured.

What is claimed is:

1. A radiation gauge comprising:
    (a) a casing having an evacuated inside;
    (b) a disk-shaped insulating material disposed in said casing, said insulating material undergoing an induced conduction phenomenon when ionizing radiation is illuminated thereon so that intensity of ionizing radiation can be measured based on the induced conduction of the insulating material;
    (c) a pair of electrode members mounted on said insulating material separated by the insulating material;
    (d) one electrode member being disk-shaped and mounted on one side of the insulating material and having a diameter less than that of the insulating material;
    the other electrode member including a disk-shaped electrode portion less in diameter than the insulating material and an annular electrode portion disposed in a concentric relationship with said disk-shaped electrode portion so that a portion of the insulating material is exposed between the disk-shaped electrode portion and the annular electrode portion.

2. A radiation gauge as defined in claim 1 wherein said casing is formed from an iron-nickel alloy.

3. A radiation gauge as defined in claim 1 wherein said electrode plates are formed from copper.

4. A radiation gauge as defined in claim 1 wherein said insulating material is aluminum oxide.

5. A radiation gauge as defined in claim 4 wherein said electrode members are brazed to the insulating material.

6. A radiation gauge as defined in claim 4 for measuring gamma radiation.

* * * * *